United States Patent
Fontes et al.

(10) Patent No.: US 8,073,830 B2
(45) Date of Patent: Dec. 6, 2011

(54) EXPANDED TEXT EXCERPTS

(75) Inventors: Paul Fontes, Mountain View, CA (US); Alexis Battle, Palo Alto, CA (US); Corin Anderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 895 days.

(21) Appl. No.: 11/394,192

(22) Filed: Mar. 31, 2006

(65) Prior Publication Data

US 2007/0239662 A1 Oct. 11, 2007

(51) Int. Cl.
G06F 17/30 (2006.01)
(52) U.S. Cl. ......................... 707/706; 708/707
(58) Field of Classification Search .................. 707/706, 707/999.3; 708/707
See application file for complete search history.

(56) References Cited

U.S. PATENT DOCUMENTS

| | | | |
|---|---|---|---|
| 6,252,597 B1 | 6/2001 | Lokuge | |
| 6,535,888 B1 * | 3/2003 | Vijayan et al. | 707/706 |
| 6,594,670 B1 * | 7/2003 | Genser | 707/102 |
| 6,785,670 B1 * | 8/2004 | Chiang et al. | 707/706 |
| 6,961,731 B2 * | 11/2005 | Holbrook | 1/1 |
| 7,162,493 B2 * | 1/2007 | Weiss et al. | 1/1 |
| 7,493,315 B2 * | 2/2009 | Holbrook | 707/3 |
| 2002/0042799 A1 | 4/2002 | Slotznick | |
| 2003/0046259 A1 | 3/2003 | Manrique et al. | |
| 2005/0278314 A1 * | 12/2005 | Buchheit | 707/3 |
| 2006/0069670 A1 | 3/2006 | Khaliq et al. | |
| 2006/0074868 A1 * | 4/2006 | Khaliq et al. | 707/3 |
| 2006/0095424 A1 * | 5/2006 | Petropoulos et al. | 707/3 |
| 2006/0248078 A1 * | 11/2006 | Gross et al. | 707/5 |
| 2006/0294476 A1 | 12/2006 | Buckley | |
| 2008/0071739 A1 * | 3/2008 | Kumar et al. | 707/3 |

FOREIGN PATENT DOCUMENTS

| WO | WO 02/19172 A1 | 3/2002 |
|---|---|---|
| WO | WO 2006/001920 A1 | 1/2006 |
| WO | WO 2007/059503 A1 | 5/2007 |

OTHER PUBLICATIONS

Ask.com, Mar. 22, 2006, 3 pages.*
Browster, Mar. 16, 2006. 8 pages.*
Brian Ulincy, Lycos Retriever: An Information Fusion Engine, Versatile Information System, Inc., 4 pages.*
International Preliminary Report on Patentability issued in corresponding international application No. PCT/US2006/060906, May 29, 2008, 8 pages.
Xiaoming Li et al., "Search Engine: Principles, Techniques and Systems", Science Publishing House, Apr. 2005, 19 pages. (English description included).

(Continued)

*Primary Examiner* — John R. Cottingham
*Assistant Examiner* — Noosha Arjomandi
(74) *Attorney, Agent, or Firm* — Harrity & Harrity, LLP (57) ABSTRACT

A system provides a list of search results, where one of the search results in the list of search results includes a snippet from a corresponding search result document. The system receives selection of the snippet and provides an expanded snippet based on the selection of the snippet. The expanded snippet includes the snippet and other text from a subset of the search result document.

36 Claims, 9 Drawing Sheets

OTHER PUBLICATIONS

U.S. Appl. No. 12/084,957, filed May 14, 2008, 36 pages.
A. Dieberger et al. "Exploratory Navigation in Large Multimedia Documents Using Context Lenses". Proceedings of the 35th Hawaii International Conference on System Sciences, Jan. 2002, 7 pages.
Jones et al.; "Interactive Document Summarisation Using Automatically Extracted Keyphrases"; Proceedings of the 35th Annual Hawaii International Conference on System Sciences; Jan. 7-10, 2001; 10 pages.
Written Opinion and International Search Report for corresponding PCT application; dated Sep. 17, 2007; 13 pages.
International Preliminary Report on Patentability issued in corresponding international application No. PCT/US2007/065472, mailed Oct. 9, 2008, 7 pages.
Dan Farber; "Browsing at 2x Normal Speed"; http://blogs.zdnet.com/BTL; Feb. 14, 2005; 2 pages.
Browster; "Browse Search Results Instantly!"; www.browster.com; Mar. 16, 2006 (print date); 8 pages.
About.com; "Binoculars FAQ"; http://websearch.about.com; Mar. 22, 2006 (print date); 3 pages.
European Search Report corresponding to EP 07 759 675, mailed Oct. 5, 2011, 7 pages.

* cited by examiner

EXPANDED TEXT EXCERPTS

BACKGROUND

1. Field of the Invention

Implementations described herein relate generally to information retrieval and, more particularly, to the providing of additional information in regard to a search result.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results.

Oftentimes, the search results include three pieces of information, such as a title, a snippet, and a link. The title identifies the corresponding web page. The snippet includes a small portion of the web page that often contains one or more of the search terms of the search query. Typically, the snippet includes no more than a sentence worth of text and might include one or more partial sentences. The link includes the address of the web page.

Users often use the snippets in determining which search result(s) to select. Because of the short length of the snippet, however, the snippet may not provide enough information for a user to make a meaningful decision regarding which search result(s) to select.

SUMMARY

According to one aspect, a method may include providing a list of search results, where a search result in the list of search results may include a text excerpt from a corresponding search result document; receiving selection of the text excerpt; and providing an expanded text excerpt based on the selection of the text excerpt, where the expanded text excerpt may include the text excerpt and additional text from the search result document but less than all of the text in the search result document.

According to another aspect, a system may include means for providing a list of search results, where a search result in the list of search results may include a snippet from a corresponding search result document; means for receiving selection of the snippet; and means for providing an expanded snippet based on the selection of the snippet, where the expanded snippet may include the snippet and other text from a subset of the search result document.

According to yet another aspect, a system may include a memory to store instructions and a processor to execute the instructions to present a list of search results. A search result in the list of search results may include a text excerpt from a corresponding search result document. The processor may determine a selection of the text excerpt and present an expanded text excerpt based on the selection of the text excerpt. The expanded text excerpt may include the text excerpt and additional text located in proximity to the text excerpt in the search result document. The additional text may comprise a portion of the search result document.

According to a further aspect, a method may include receiving a search query; performing a search based on the search query to identify multiple search result documents; forming a list of search results based on the search result documents, where at least a subset of the search results may include a text excerpt from a corresponding subset of the search result documents; and providing the list of search results. The method may also include receiving a request for an expanded text excerpt in connection with one of the search results; generating the expanded text excerpt, where the expanded text excerpt may include the text excerpt and text in proximity to the text excerpt in the corresponding one of the search result documents, and the text may comprise a portion of the corresponding one of the search result documents; and providing the expanded text excerpt.

According to another aspect, a method may include receiving a search query; performing a search based on the search query to identify multiple search result documents; and forming a list of search results based on the search result documents, where at least a subset of the search results may include a text excerpt from a corresponding subset of the search result documents. The method may also include generating an expanded text excerpt for at least one of the search results, where the expanded text excerpt may include the text excerpt and text in proximity to the text excerpt in the corresponding one of the search result documents, and the text may comprise a portion of the corresponding one of the search result documents; and providing the list of search results and the expanded text excerpt.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Implementations consistent with principles of the invention may selectively provide context information associated with a snippet of a search result document. The context information may include text that occurs before and/or after the snippet in the search result document. This text may provide context to the snippet and, thus, make the snippet more meaningful to a user.

Figure 1:
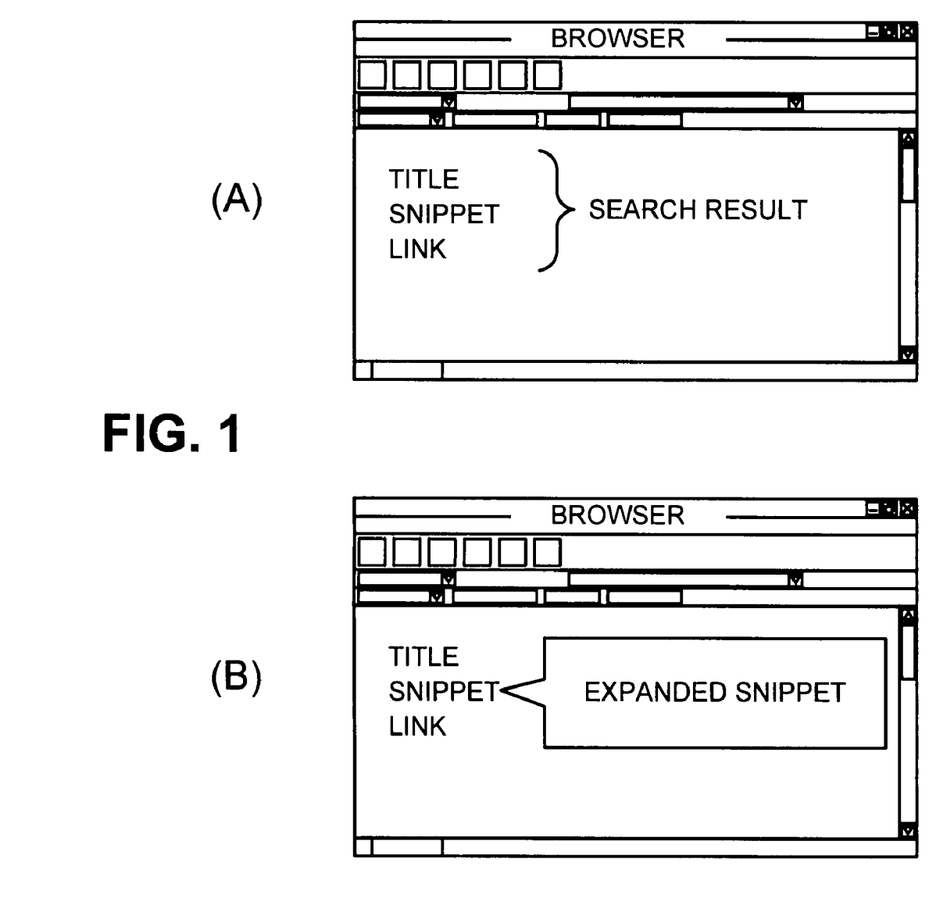
FIG. 1 is an exemplary diagram illustrating a concept consistent with principles of the invention.

FIG. 1 is an exemplary diagram illustrating a concept consistent with the principles of the invention. As shown at (A), a user may obtain search results by, for example, providing a search query to a search engine for performance of a search and receiving the results of the search. The search may be performed based on documents stored at a local computer or stored at one or more locations in a local network or a wide area network, such as the Internet. A single search result is shown at (A). The search result may include a title, a snippet, and a link.

If the user desires additional information regarding the snippet, the user may select the snippet using, for example, a pointing device, such as a mouse. As shown at (B), an expanded snippet may be presented to the user in response to the user selecting the snippet. The expanded snippet may provide context for the snippet by providing text of the snippet and text that occurs before and/or after the snippet in the search result document. The expanded snippet may permit the user to make a more meaningful decision of whether to retrieve the entire search result document.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
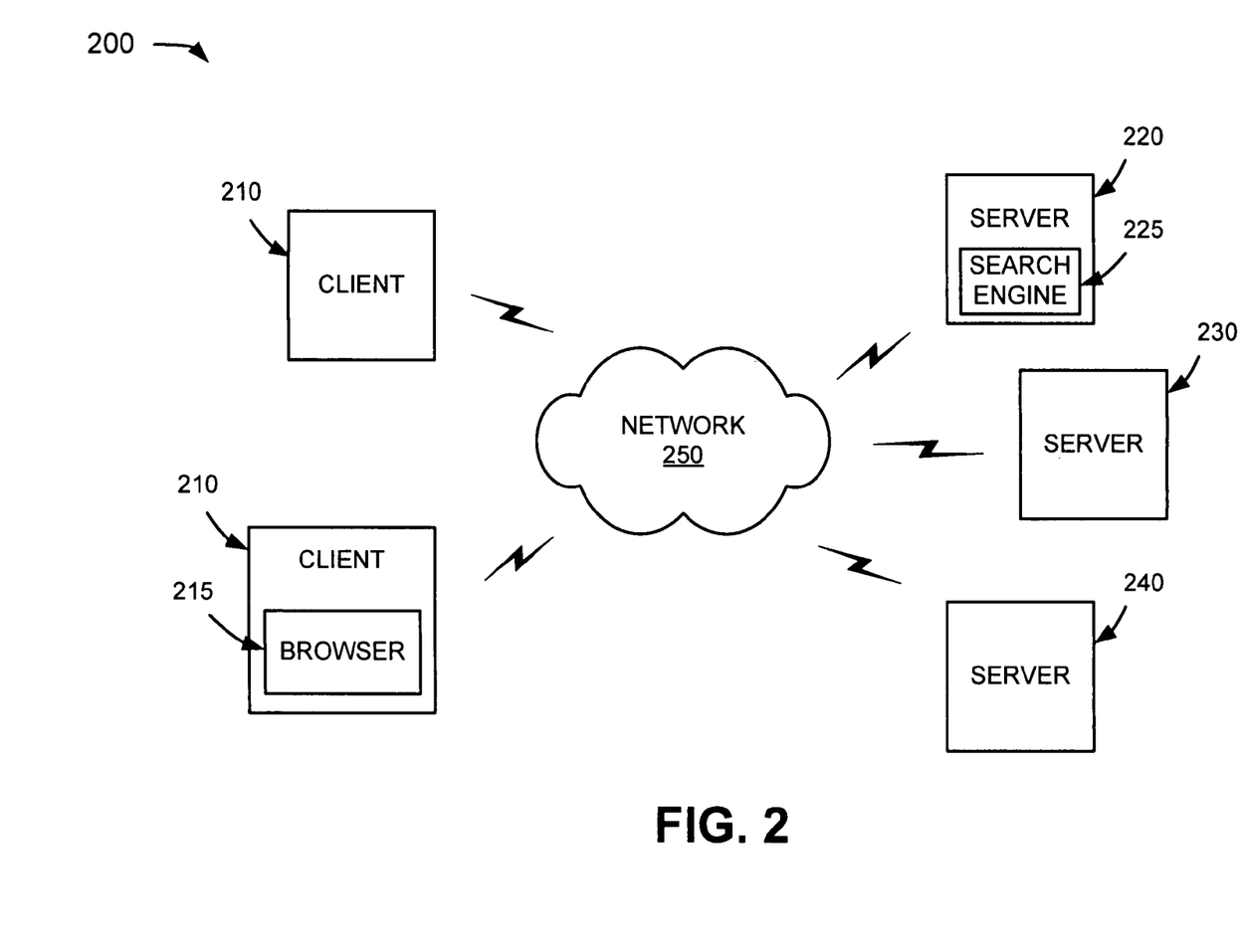
FIG. 2 is an exemplary diagram of a network in which systems and methods consistent with principles of the invention may be implemented.

FIG. 2 is an exemplary diagram of a network 200 in which systems and methods consistent with principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices.

In one implementation, a client 210 may include a browser 215. Browser 215 may permit a user to access documents and may provide an interface to a search engine. Browser 215 may permit a user to interact with the search engine to perform local (e.g., local drive, local database, local network, etc.) and/or non-local (e.g., remote database or network, wide area network, etc.) searches. Browser 215 may include a browser assistant that may take the form of an add-on toolbar or some other functionality that may operate separate from, but in conjunction with, browser 215. In another implementation, the browser assistant may be integrated as part of browser 215. In either case, the browser assistant may operate as an interface between browser 215 and network 250.

Servers 220-240 may include server entities that gather, process, search, and/or maintain documents in a manner consistent with the principles of the invention. In an implementation consistent with principles of the invention, server 220 may include a search engine 225 usable by clients 210. Server 220 may crawl a corpus of documents, index the documents, and store information associated with the documents in a repository of documents. Search engine 225 may execute a search using a query, received from a user at a client 210, on the corpus of documents stored in the repository of documents.

Servers 230 and 240 may store or maintain documents that may be crawled or analyzed by server 220. Such documents may include data related to published news stories, products, images, user groups, geographic areas, or any other type of data. For example, servers 230 and 240 may store or maintain news stories from any type of news source, such as, for example, the Washington Post, the New York Times, Time magazine, or Newsweek. As another example, servers 230 and 240 may store or maintain data related to specific products, such as product data provided by one or more product manufacturers. As yet another example, servers 230 and 240 may store or maintain data related to other types of web documents, such as pages of web sites.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
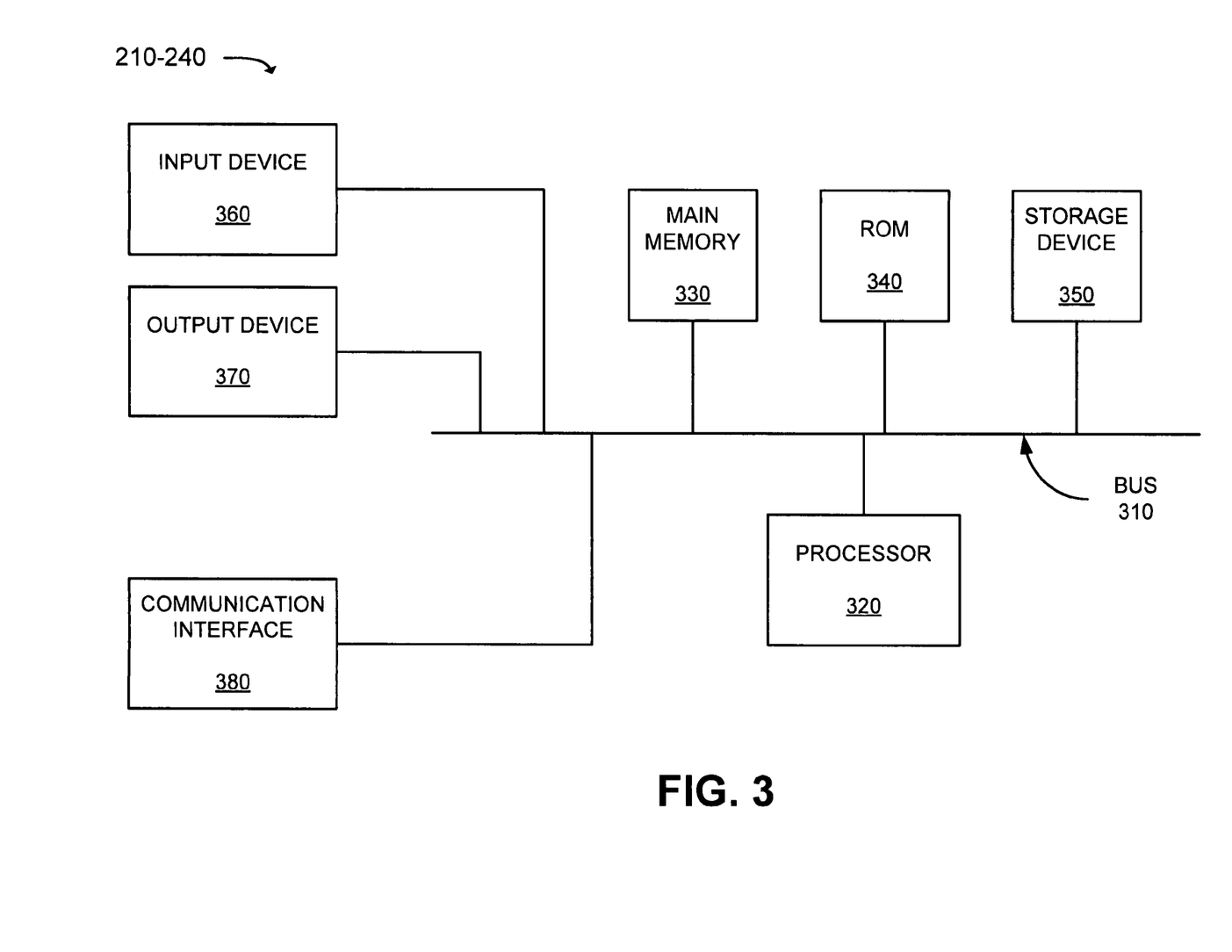
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with principles of the invention, may perform certain operations relating to the presentation of search results. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 4:
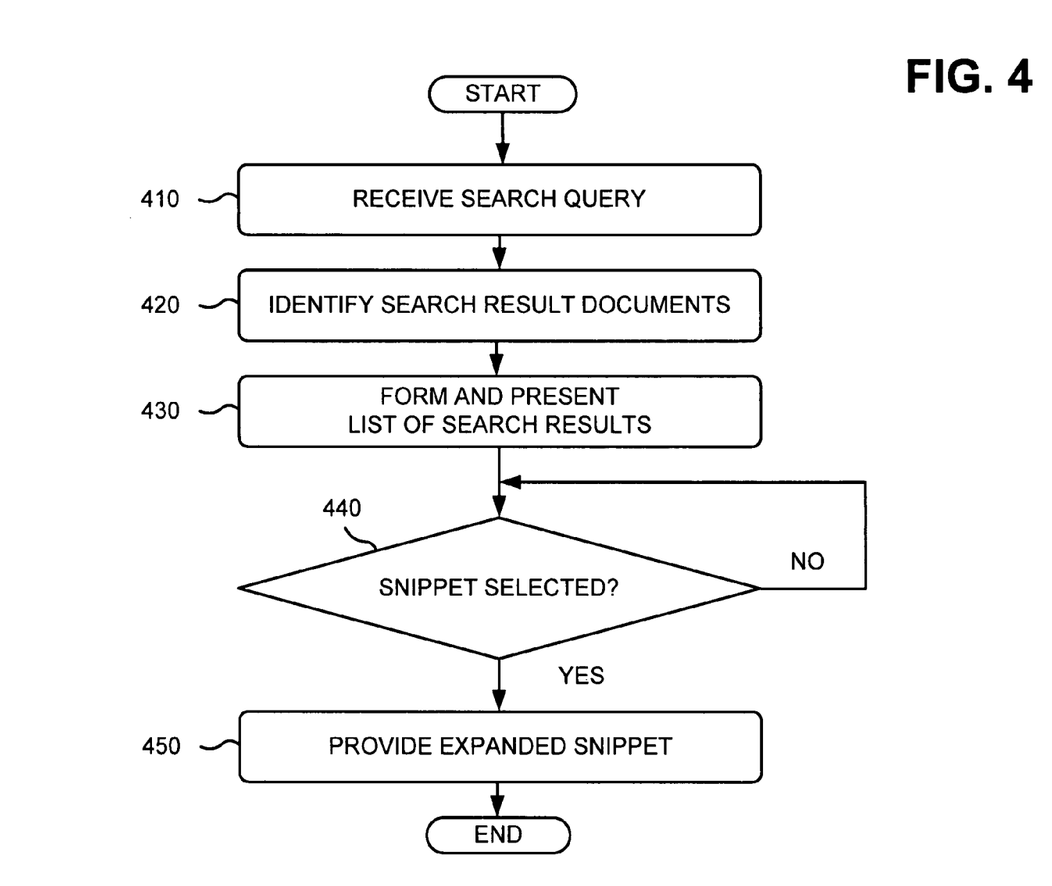
FIG. 4 is a flowchart of exemplary processing for presenting search result information according to an implementation consistent with principles of the invention.

FIG. 4 is a flowchart of exemplary processing for presenting search result information according to an implementation consistent with the principles of invention. In one implementation, the processing of FIG. 4 may be performed by one or more software and/or hardware components within server 220, client 210, or a combination of server 220 and client 210. In another implementation, the processing may be performed by one or more software and/or hardware components within another device or a group of devices separate from or including server 220 and/or client 210. FIGS. 5-9 are exemplary diagrams of information that may be presented to a user.

Figure 5:
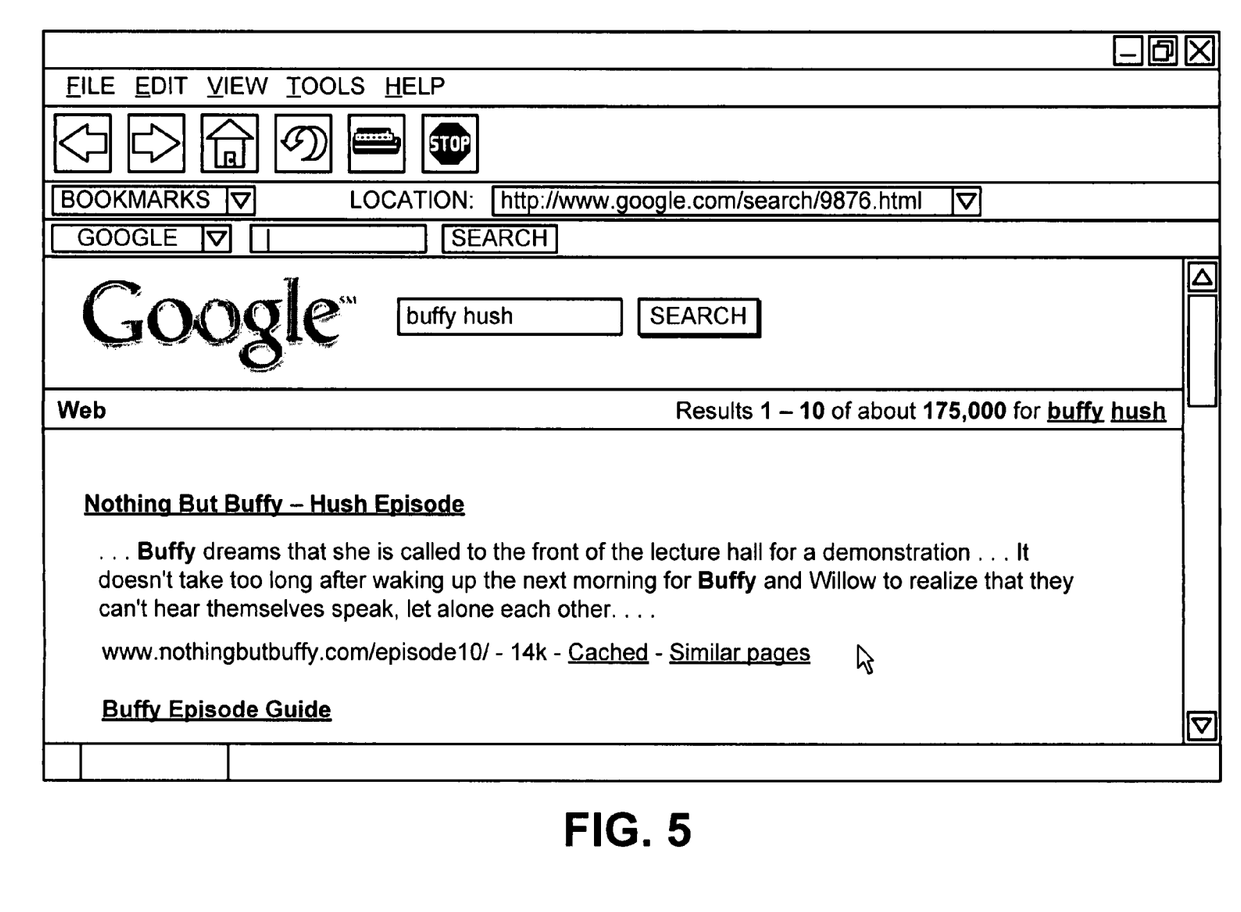
FIGS. 5-9 are exemplary diagrams of information that may be presented to a user.

Processing may begin with a search query being received (block 410). For example, a user might provide one or more search terms of a search query to a search engine interface presented by browser 215 on a client 210. The search engine interface might be provided within a document presented within a browser window provided by browser 215 or on a toolbar or in another place within the browser 215. In any event, browser 215 may send the search query to a search engine, such as search engine 225. As shown in FIG. 5, assume that the user provides a search query "buffy hush" to the search engine interface.

A search may be performed based on the search query to identify search result documents (block 420). The search result documents may include documents that satisfy the search query in some manner, such as by including a search term of the search query. Under the example shown in FIG. 5, search engine 225 may identify documents that include the search term "buffy," the search term "hush," or a combination of the search terms.

A list of search results may be formed based on the identified search result documents (block 430). For example, scores may be determined for each of the search result documents. In one implementation, the score for a search result document may be based on an information retrieval (IR) score, a link-based score, or a combination of the IR and link-based scores. The IR score for a search result document may be based on the number of occurrences of the search term(s) in the document. The IR score may be adjusted based on where a search term occurs within the document (e.g., title, content, etc.) or based on a characteristic of the search term (e.g., font, size, color, etc.). The IR score may also, or alternatively, be adjusted based on the proximity of the search terms when multiple search terms are present. Yet other techniques for generating or adjusting an IR score for a document are known to those skilled in the art. The link-based score for a search result document may be based on the number and/or quality of links to or from the search result document. Several techniques exist for determining the link-based score of a document.

In one implementation, the search result documents may be ranked (e.g., sorted) based on their scores and presented as a list of search results (block 430). The list of search results may be provided as a hypertext markup language (HTML) document, similar to search results provided by existing search engines. Alternatively, the search results may be provided according to another format, such as in the form of an extensible markup language (XML) document. As shown in FIG. 5, assume that two of the search result documents correspond to documents entitled "Nothing But Buffy—Hush Episode" and "Buffy Episode Guide."

The list of search results may be presented to the user via, for example, a browser window of browser 215. The information associated with a search result may include a title, a snippet, an address, and/or various links associated with the search result document corresponding to the search result. The title may identify the search result document or a portion of the search result document and, when selected, may cause the search result document to be presented. As shown in FIG. 5, the title of one of the search result documents includes "Nothing But Buffy—Hush Episode." The snippet may include a small text excerpt from the search result document. In one implementation, the snippet may include all or part of a sentence or all or part of two (or more) sentences. As shown in FIG. 5, the snippet for the Nothing But Buffy—Hush Episode document includes two text excerpts from the document.

The address may identify the network address (e.g., uniform resource locator (URL) address) of the search result document. As shown in FIG. 5, the address for the Nothing But Buffy—Hush Episode document includes "www.nothingbutbuffy.com/episode10." The various links may permit other information to be presented or other action(s) to be performed. As shown in FIG. 5, the various links may include a "Cached" link that may permit a cached version of the search result document to be presented, and a "Similar pages" link that may permit other documents similar to the search result document to be presented.

At some point, the user may desire additional information regarding one of the search result documents that the user might not be able to get from the little amount of information contained in the snippet. For example, the text excerpt of the snippet may contain an out-of-context text excerpt and if the snippet were a little longer it might be sufficient for the user to determine whether the corresponding search result document is what the user is seeking before investing the time to actually access the search result document.

Figure 6:
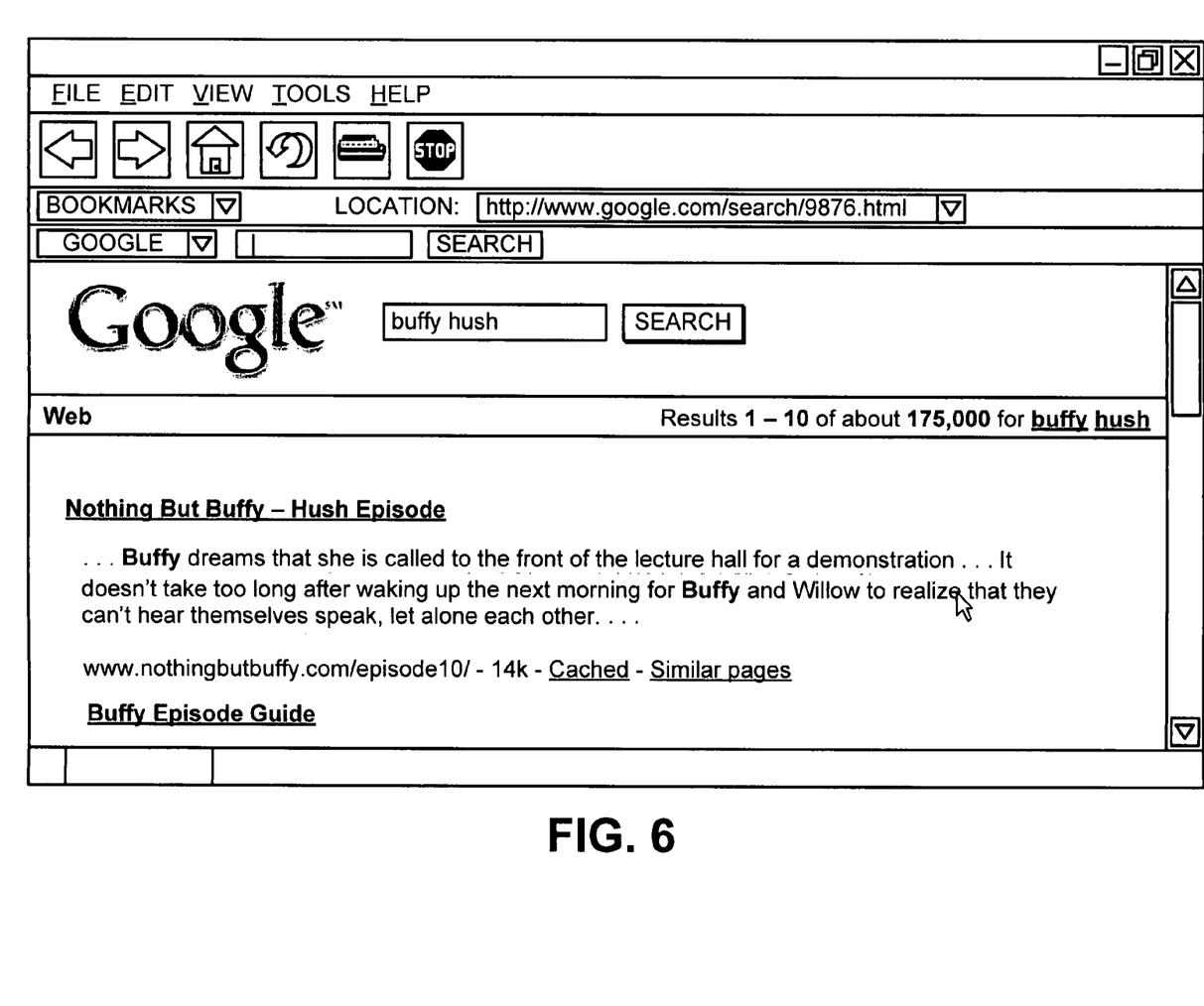

If the user desires additional information regarding a search result document, the user might select the snippet. In one implementation, selection of a snippet might include clicking on the snippet using a pointing device, such as a mouse. In another implementation, selection of a snippet might include a mouse-over event, such as placing a cursor of a pointing device over the snippet for a predetermined amount of time. If the snippet includes multiple text excerpts, the user might select one of the text excerpts to obtain additional information (context) regarding that text excerpt. As shown in FIG. 6, assume that the user selects the second text excerpt.

If the snippet is selected (block 440—YES), an expanded snippet may be provided (block 450). An expanded snippet may include the text excerpt of the snippet with additional text located in proximity to the text excerpt in the search result document, such as text before and/or after the text excerpt. In one implementation, the additional text may include a predetermined amount of text, such as a predetermined number of terms, before and/or after the text excerpt in the search result document. In another implementation, the additional text may be more intelligently selected. For example, the additional text may include all (or less than all) of the text preceding the text excerpt to a beginning or end of a structural component (e.g., paragraph, table entry, section, etc.) in which the text excerpt occurs in the search result document. Alternatively, or additionally, the additional text may include a previous and/or following structural component based on the structural component in which the text excerpt occurs in the search result document.

In a first implementation, browser 215 may detect selection of the snippet. Browser 215 may generate a request for the expanded snippet and send the request to a server, such as server 220. Server 220 generate the expanded snippet based on text from the search result document and send the expanded snippet to browser 215. In a second implementation, server 220 may provide expanded snippets for one or more of the search result documents when server 220 provides the list of search results to browser 215. In this case, the expanded snippets may be generated and embedded within the list of search results and cached by client 210. In a third implementation, browser 215 may prefetch an expanded snippet for one or more of the search results before the user actually requests it. For example, browser 215 may present the list of search results and automatically send a request for an expanded snippet for a set of the search result documents (without waiting for selection of a snippet by the user). Alternatively, browser 215 may detect a cursor associated with a pointing device moving over the snippet and automatically send a request for an expanded snippet for the corresponding search result (in anticipation that the user might actually select the snippet). The expanded snippet(s) may be cached in anticipation that the user might actually request it/them.

An advantage of the first and third techniques is that the list of search results can be formed without the need to generate expanded snippets for one or more of the search results, which may never be requested by the user. Another advantage of the first technique is that the amount of bandwidth and processing needed for the search would be less than the second and third techniques because only expanded snippets actually requested by the users are generated/provided. An advantage of the second and third techniques is that an expanded snippet can be presented quickly to the user since it has already been cached. The particular technique that is implemented may be based on network and/or system constraints, but could be user-configurable.

Figure 7:
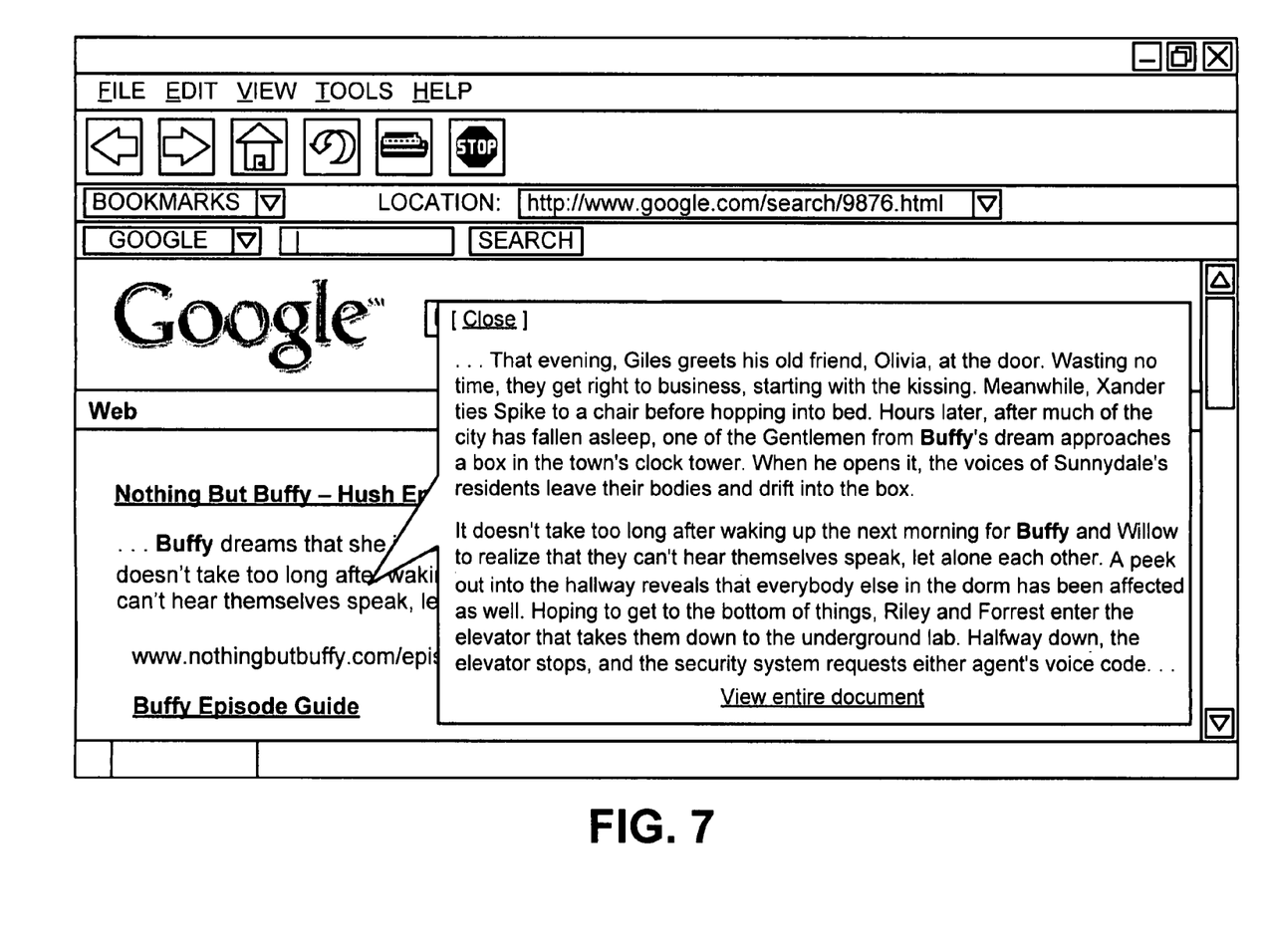
Figure 8:
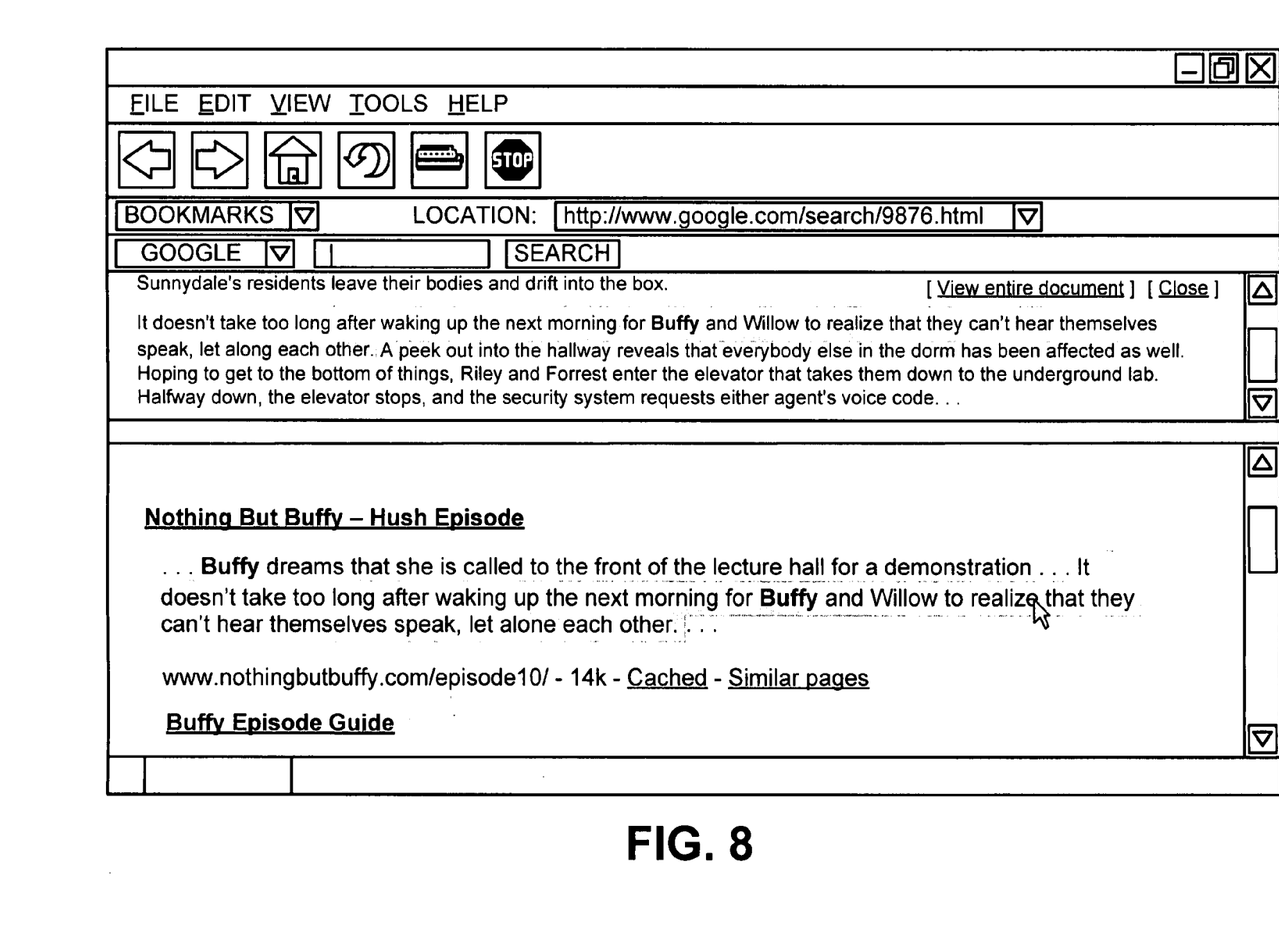
Figure 9:
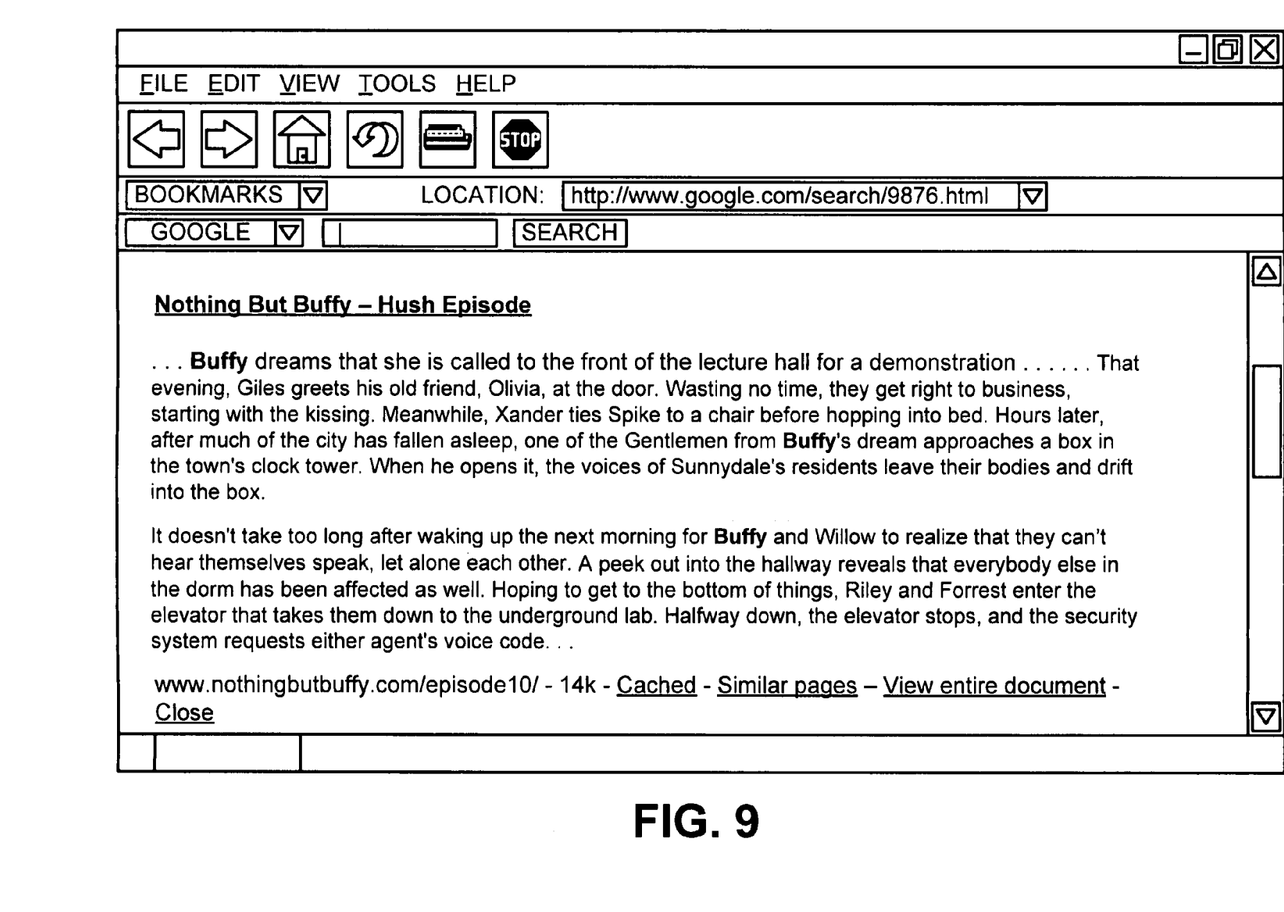

The expanded snippet may be presented within a snippet box associated with the list of search results. In one implementation, the snippet box may take the form of a small overlay that may be superimposed over the search results, such as shown in FIG. 7. In another implementation, the snippet box may take the form of a frame that is presented in connection with the list of search results, such as shown in FIG. 8. As further shown in FIGS. 7 and 8, the text excerpt originally in the snippet might be visually distinguished in some manner (e.g., highlighted, bolded, etc.) to identify it within the expanded snippet. Alternatively, the expanded snippet may be presented inline within the list of search results. For example, the list of search results may be represented such that the search result for which the expanded snippet was requested may be changed to include the expanded snippet in place of (or in addition to) the snippet originally presented with the search result, such as shown in FIG. 9. As further shown in FIG. 9, the text excerpt originally in the snippet might be visually distinguished in some manner to identify it within the expanded snippet.

The expanded snippet may permit the user to access the entire search result document. As shown in FIGS. 7-9, the expanded snippet might include a "view entire document" link that, when selected, may cause the corresponding search result document to be retrieved.

In addition, or alternatively, the expanded snippet may permit the user to remove the expanded snippet and, thus, return to the original list of search results. As shown in FIGS. 7-9, the expanded snippet might include a "close" link that, when selected, may cause the expanded snippet to be removed. In the example of FIGS. 7 and 8, selection of the close link may cause the snippet box to disappear. In the example of FIG. 9, selection of the close link may cause the original list of search results to be re-presented, such as shown in FIG. 5.

CONCLUSION

Implementations consistent with principles of the invention may selectively provide an expanded snippet to permit a user to more intelligently choose which search result document to access.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 4, the order of the acts may be modified in other implementations consistent with the principles of the invention. Further, non-dependent acts may be performed in parallel.

Also, exemplary user interfaces have been described with respect to FIGS. 5-9. In other implementations consistent with the principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more devices, comprising:
    receiving, from a user, a search query that includes one or more search terms; providing, by one or more processors associated with the one or more devices and based on the search query, search results to the user, where at least one of the search results includes a reference and a text excerpt,
    where the reference specifies a search result document, and
    where the text excerpt is obtained from text in the specified search result document and includes text, from the specified search result document, other than the one or more search terms;
    receiving, by one or more processors associated with the one or more devices and from the user, selection of the text excerpt;
    providing, to the user, by one or more processors associated with the one or more devices and in response to the selection by the user of the text excerpt, an expanded text excerpt that includes the selected text excerpt and additional text from the text in the specified search result document,
    where the expanded text excerpt comprises less than all of the text in the specified search result document, where the expanded text excerpt is provided for display with the search results, and
    where the text excerpt is visually distinguished within the provided expanded text excerpt; and
    presenting an option for removing the expanded text excerpt and re-presenting, in response to the selection of the option for removing the expanded text excerpt, the at least one of the search results within the search results,
    where the re-presented at least one of the search results does not include the expanded text excerpt.

2. The method of claim 1, where receiving selection of the text excerpt includes:
    detecting a click on the text excerpt, and
    where providing, to the user, the expanded text excerpt includes:
        providing, to the user and in response to the detected click on the text excerpt, the expanded text excerpt.

3. The method of claim 1, where receiving selection of the text excerpt includes:
    detecting a cursor being placed over the text excerpt for a particular amount of time, and
    where providing, to the user, the expanded text excerpt includes:
        providing, to the user and in response to the detected cursor being placed over the text excerpt for the particular amount of time, the expanded text excerpt.

4. The method of claim 1, where the text excerpt is one of a plurality of text excerpts that are included in the search results; and
    where receiving selection of the text excerpt includes:
        receiving selection of one of the plurality of text excerpts.

5. The method of claim 1, further comprising:
    receiving the search results together with the expanded text excerpt for the at least one of the search results.

6. The method of claim 1, where providing an expanded text excerpt includes:
    presenting the expanded text excerpt within an overlay.

7. The method of claim 6, where presenting the expanded text excerpt within an overlay includes:
    positioning the overlay in visual proximity to the at least one of the search results in the search results.

8. The method of claim 6, where presenting the expanded text excerpt within an overlay includes:
    presenting an option for accessing the entire specified search result document from within the overlay, and
    where the method further comprises:
        receiving selection of the option for accessing the entire specified search result document; and
        providing, in response to the selection, the entire specified search result document for display.

9. The method of claim 6, where presenting the expanded text excerpt within an overlay includes:
    presenting an option for removing the expanded text excerpt from within the overlay, and
    where the method further comprises:
        receiving selection of the option; and
        removing, in response to the selection of the option for removing the expanded text excerpt from within the overlay, the expanded text excerpt from within the overlay.

10. The method of claim 1, where providing an expanded text excerpt includes:
    modifying the at least one of the search results to include the expanded text excerpt, and
    providing the modified search result within the search results.

11. The method of claim 1, where providing an expanded text excerpt includes:
    presenting the expanded text excerpt within a frame that is separate from the search results.

12. The method of claim 1, further comprising:
    generating a request for the expanded text excerpt, where the request is generated in response to the selection of the text excerpt; and
    obtaining the expanded text excerpt based on the generated request.

13. The method of claim 1, where providing the search results includes:
    causing a search to be performed based on the search query to identify a plurality of search result documents;
    receiving the search results based on the plurality of search result documents, at least a subset of the search results including a text excerpt from a corresponding subset of the plurality of search result documents;
    receiving the expanded text excerpt for the at least one of the search results; and
    causing the search results and the expanded text excerpt to be presented on a display associated with the one or more devices.

14. The method of claim 1, where providing the search results includes:
    causing a search to be performed based on the search query that comprises the one or more search terms; and
    providing the search results in response to the search, where the text excerpt, included in the at least one of the search results, includes the one or more search terms and the text other than the one or more search terms.

15. The method of claim 14, where the one or more search terms, of the search query, are further visually distinguished within the visually distinguished text excerpt.

16. The method of claim 1, where the at least one of the search results includes the text excerpt and a second text excerpt different than the text excerpt, where the second text excerpt is obtained from the text in the specified search result document, the method further comprising:
receiving, from the user, selection of the second text excerpt; and
providing, to the user and in response to the selection of the second text excerpt, a second expanded text excerpt, different than the expanded text excerpt, that includes the selected second text excerpt and second additional text, different than the second text excerpt, from the text in the specified search result document, where the second expanded text excerpt comprises less than all of the text in the specified search result document, and
where the second expanded text excerpt is provided for display with the search results.

17. The method of claim 1, further comprising:
receiving input, from the user, relating to a manner for providing the expanded text excerpt; and
one of:
receiving the expanded text excerpt in response to sending a request for the expanded text excerpt, the request for the expanded text excerpt being based on the selection of the text excerpt;
receiving the search results along with the expanded text excerpt; or
obtaining the expanded text excerpt prior to receiving the selection of the text excerpt and after receiving the search results.

18. A system, comprising:
one or more devices comprising:
means for providing, to a user search results, each search result, in the search results, corresponding to one of a plurality of search result documents, a particular search result in the search results including a snippet of text from text in a corresponding search result document;
means for receiving, from the selection of the snippet of text; and means for causing an expanded snippet to be presented, to the user, with the search results, based on the selection of the snippet of text, the expanded snippet including the snippet of text and other text from a subset of the text in the corresponding search result document, the expanded snippet being displayed within one of an overlay or a frame that is separate from the search results,
where the expanded snippet substantially fills the one of the overlay or the frame,
where the other text is visually distinct from text of the snippet of text,
where the other text provides context for the text of the snippet of text, and where the expanded snippet comprises less than all of the text in the corresponding search result document; and
presenting an option for removing the expanded text excerpt and re-presenting, in response to the selection of the option for removing the expanded snippet, the at least one of the search results within the search results,
where the re-presented at least one of the search results does not include the expanded snippet.

19. The system of claim 18, further comprising:
means for generating a request for the expanded snippet;
means for transmitting the generated request to a server device; and
means for receiving the expanded snippet in response to transmitting the generated request.

20. The system of claim 19, where the means for generating the request for the expanded snippet includes:
means for generating the request in response to the selection of the snippet.

21. The system of claim 19, where the means for generating the request for the expanded snippet includes:
means for detecting a cursor being placed over the snippet, and
means for generating the request based on the detection of the cursor remaining over the snippet for at least a particular amount of time.

22. The system of claim 18, where the snippet of text is included in a first structural component of the corresponding search result document,
where the other text is included in a second structural component, of the corresponding search result document, that at least one of precedes or follows the first structural component, the second structural component being different than the first structural component, and
where each of the first structural component and the second structural component comprises at least one paragraph or section of the text in the corresponding search result document.

23. The method of claim 18, where the snippet of text is visually distinguished within the expanded snippet displayed within the one of the overlay or the frame.

24. A system, comprising:
a memory to store instructions;
and a processor to execute the instructions to:
present a list of search results associated with a search query that includes one or more search terms, a search result, in the list of search results, including a text excerpt from a corresponding search result document,
where the text excerpt includes text, from the corresponding search result document, other than the one or more search terms,
detect selection of the text excerpt,
present an expanded text excerpt, along with the presented list of search results, based on the detected selection of the text excerpt, the expanded text excerpt including
the selected text excerpt and additional text located in proximity to the selected text excerpt in the corresponding search result document, the additional text and the text excerpt comprising a portion of text, in the corresponding search result document, that is less than an entirety of the text in the corresponding search result document,
where a portion of the text excerpt is visually distinguished within the presented expanded text excerpt, the portion of the text excerpt including a portion of the text other than the one or more search terms,
where the additional text includes text located within the corresponding search result document between the text excerpt and a beginning or an ending of a structural component, of the corresponding search result document, that includes the text excerpt, and
where the structural component comprises at least one of a paragraph or a section of the corresponding search result document; and
presenting an option for removing the expanded text excerpt and re-presenting, in response to the selection of the option for removing the expanded text excerpt, the at least one of the search results within the search results,
where the re-presented at least one of the search results does not include the expanded text excerpt.

25. The system of claim 24, where, when detecting a selection of the text excerpt, the processor is to detect a click on the text excerpt, and
where, when presenting the expanded text excerpt along with the presented list of search results, the processor is to:
present, based on the detected click on the text excerpt, the expanded text excerpt along with the presented list of search results.

26. The system of claim 24, where, when detecting a selection of the text excerpt, the processor is to detect a cursor being placed over the text excerpt for a particular amount of time, and
where, when presenting the expanded text excerpt along with the presented list of search results, the processor is to:
present, based on the detected cursor being placed over the text excerpt for the particular amount of time, the expanded text excerpt along with the presented list of search results.

27. The system of claim 24, where the text excerpt is one of a plurality of text excerpts included in the list of search results;
where, when detecting selection of the text excerpt, the processor is to detect selection of one of the plurality of text excerpts; and
where, when presenting an expanded text excerpt, the processor is to:
select a particular expanded text excerpt based on the detected selection of the one of the plurality of text excerpts, and
present the particular expanded text excerpt.

28. The system of claim 24, where the processor is further to:
generate a request for the expanded text excerpt, and
receive the expanded text excerpt in response to the generated request.

29. The system of claim 28, where the request is generated in response to the selection of the text excerpt.

30. The system of claim 28, where, when generating a request for the expanded text excerpt, the processor is to:
detect a cursor being placed over the text excerpt, and
generate the request based on the detection of the cursor remaining over the text excerpt for at least a particular amount of time.

31. The system of claim 24, where the processor is further to receive, from a server, the list of search results together with the expanded text excerpt for the search result.

32. The system of claim 24, where the expanded text excerpt is presented within an overlay.

33. The system of claim 32, where the overlay is positioned in visual proximity to the search result in the list of search results.

34. The system of claim 32, where the overlay provides an option for accessing the entire corresponding search result document, and
where the processor is further to: receive selection of the option for accessing the entire corresponding search result document; and
provide, in response to the selection of the option for accessing the entire corresponding search result document, the entire corresponding search result document for display.

35. The system of claim 24, where, when presenting the expanded text excerpt, the processor is to:
modify the search result to include the expanded text excerpt, and
provide the modified search result within the list of search results,
where the option to remove the expanded text excerpt is presented when the modified search result is provided.

36. The system of claim 24, where the expanded text excerpt is presented within a frame separate from the list of search results.

* * * * *

UNITED STATES PATENT AND TRADEMARK OFFICE
CERTIFICATE OF CORRECTION

| | | |
|---|---|---|
| PATENT NO. | : 8,073,830 B2 | Page 1 of 2 |
| APPLICATION NO. | : 11/394192 | |
| DATED | : December 6, 2011 | |
| INVENTOR(S) | : Paul Fontes et al. | |

It is certified that error appears in the above-identified patent and that said Letters Patent is hereby corrected as shown below:

Claim 1 (Column 9, line 2) after "devices" insert --the method--.

Claim 10 (Column 10, line 24) after "excerpt" delete the "," and insert a --;--;

Claim 10 (Column 10, line 25) after "modified" insert --at least one of the-- and after "search" delete "result" and insert --results--; and Claim 10 (Column 10, line 26) after "results" insert --, where the option for removing the expanded text excerpt is presented when the modified at least one of the search results is provided--.

Claim 18 (Column 11, line 30) after "user", insert --,--;

Claim 18 (Column 11, line 35) after "from the", insert --user,--;

Claim 18 (Column 11, line 36) after "text;" delete "and";

Claim 18 (Column 11, line 48) delete "where the other text provides context for the text of the";

Claim 18 (Column 11, line 49) delete "snippet of text,";

Claim 18 (Column 11, line 52) before "presenting" insert --means for--; after "expanded" insert --snippet-- and delete "text";

Claim 18 (Column 11, line 53) before "and" delete "excerpt" and after "to" delete "the";

Claim 18 (Column 11, line 54) after "snippet," delete "the at";

Claim 18 (Column 11, line 55) delete "least one of", after "the", first occurrence, insert --particular--, and after "search" delete "results" and insert --result--; and Signed and Sealed this
First Day of May, 2012

David J. Kappos
*Director of the United States Patent and Trademark Office*

CERTIFICATE OF CORRECTION (continued)
U.S. Pat. No. 8,073,830 B2

Claim 18 (Column 11, line 56) after "re-presented" delete "at least one of the", and insert --particular-- and after "search" delete "results" and insert --result--.

Claim 24 (Column 12, line 60) after "document" delete ";" and insert --,--;

Claim 24 (Column 12, line 61) delete "presenting" and insert --present--, and after "option" delete "for removing" and insert --to remove--;

Claim 24 (Column 12, line 62) after "and" delete "re-presenting" and insert --re-present--; and after "response to" delete "the";

Claim 24 (Column 12, line 63) after "option" delete "for removing" and insert --to remove--; and after "excerpt, the", delete "at";

Claim 24 (Column 12, line 64) delete "least one of the", and after "search" delete "results" and insert --result--;

Claim 24 (Column 12, line 66) after "re--presented" delete "at least one of the", and after "search" delete "results" and insert --result'--.